United States Patent [19]

Feamster, III

[11] 4,322,991

[45] Apr. 6, 1982

[54] CANOPY CUTTING DEVICE

[76] Inventor: William C. Feamster, III, 4013 Nina Dr., Chesapeake, Va. 23321

[21] Appl. No.: 128,370

[22] Filed: Mar. 7, 1980

Related U.S. Application Data

[62] Division of Ser. No. 884,245, Mar. 7, 1978, Pat. No. 4,236,428.

[51] Int. Cl.³ .............................................. B23B 3/26
[52] U.S. Cl. ........................................ 82/4 R; 82/4 C
[58] Field of Search ..................... 82/4 R, 4 C; 30/97, 30/98

[56] References Cited

U.S. PATENT DOCUMENTS

| | | | |
|---|---|---|---|
| 1,972,022 | 8/1934 | LeMay | 82/4 C |
| 2,181,450 | 11/1939 | Davenport | 82/4 R |
| 2,706,425 | 4/1955 | Sherrill | 82/4 R |
| 3,078,749 | 2/1963 | Maxner et al. | 82/4 R |
| 3,083,600 | 4/1963 | Rhindress | 82/4 R |
| 3,141,368 | 7/1964 | Kelley et al. | 82/4 R |
| 3,818,786 | 6/1974 | Leshem | 82/4 C |
| 3,839,791 | 10/1974 | Feamster | 30/97 |

FOREIGN PATENT DOCUMENTS 27387 of 1903 United Kingdom ................. 82/4 R Primary Examiner—Leonidas Vlachos
Attorney, Agent, or Firm—Nathaniel A. Humphries

[57] ABSTRACT

A canopy cutting device, for machining canopies and the like in constricted spaces, including a housing having a base plate, a bearing mounted on the housing, a support for retaining the axis of the bearing in a desired position, a ring gear carriage mounted on the bearing for rotation about the bearing, a cutting tool mounted on the carriage, a pinion gear mounted for rotation on the housing and engageable with the ring gear, a drive shaft connected to the pinion gear, and a feed device for advancing the cutting tool along the axis during rotation of the ring gear thereby permitting removal of a canopy or the like.

9 Claims, 11 Drawing Figures

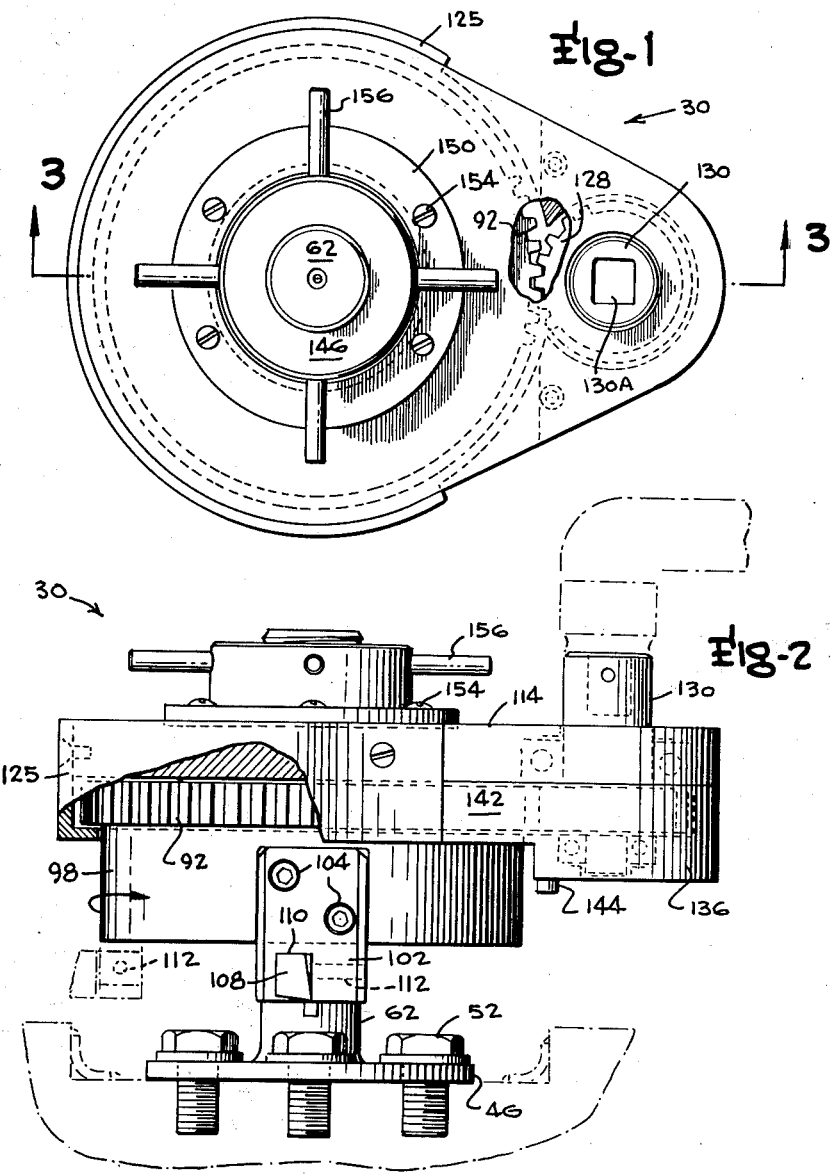

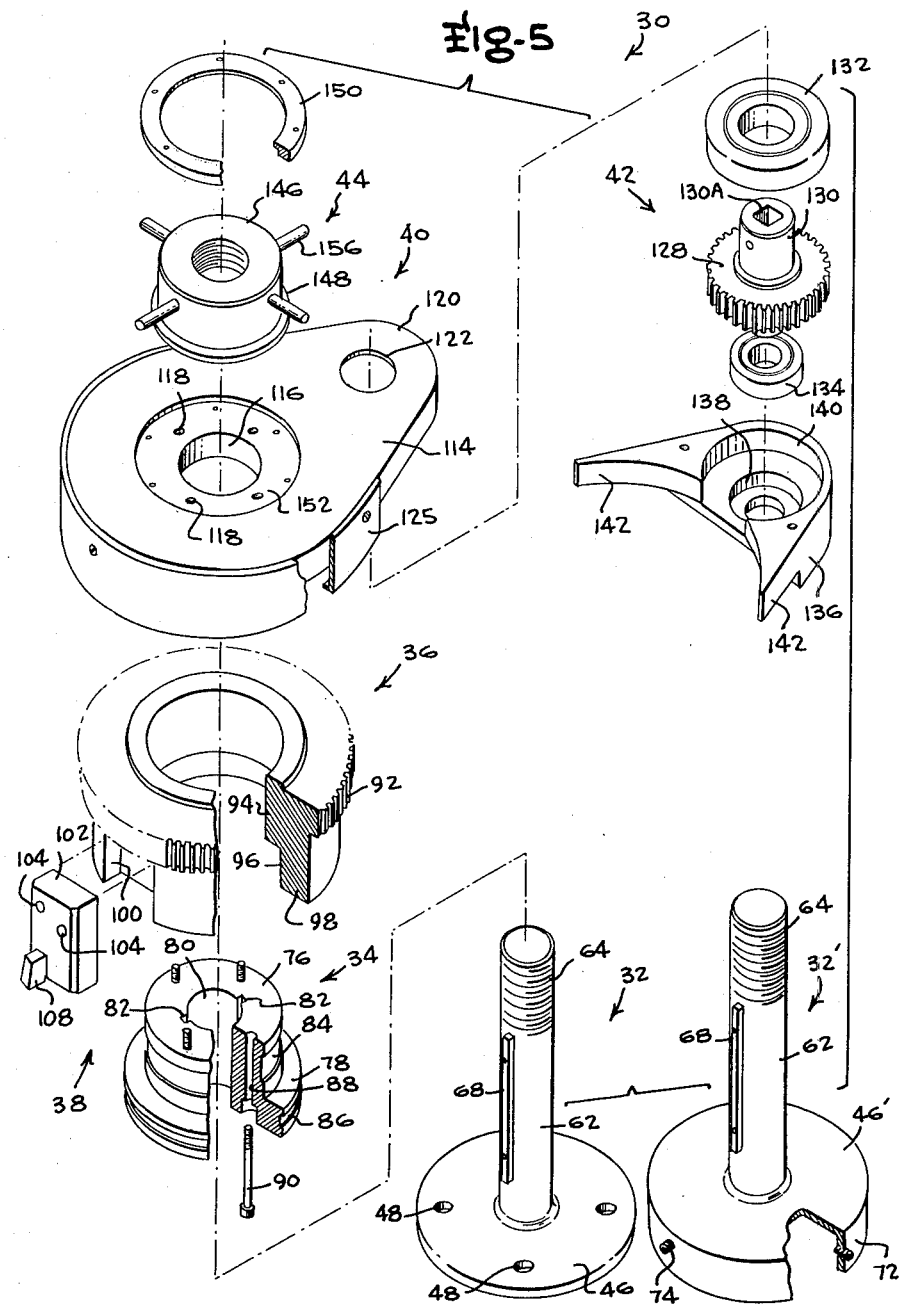

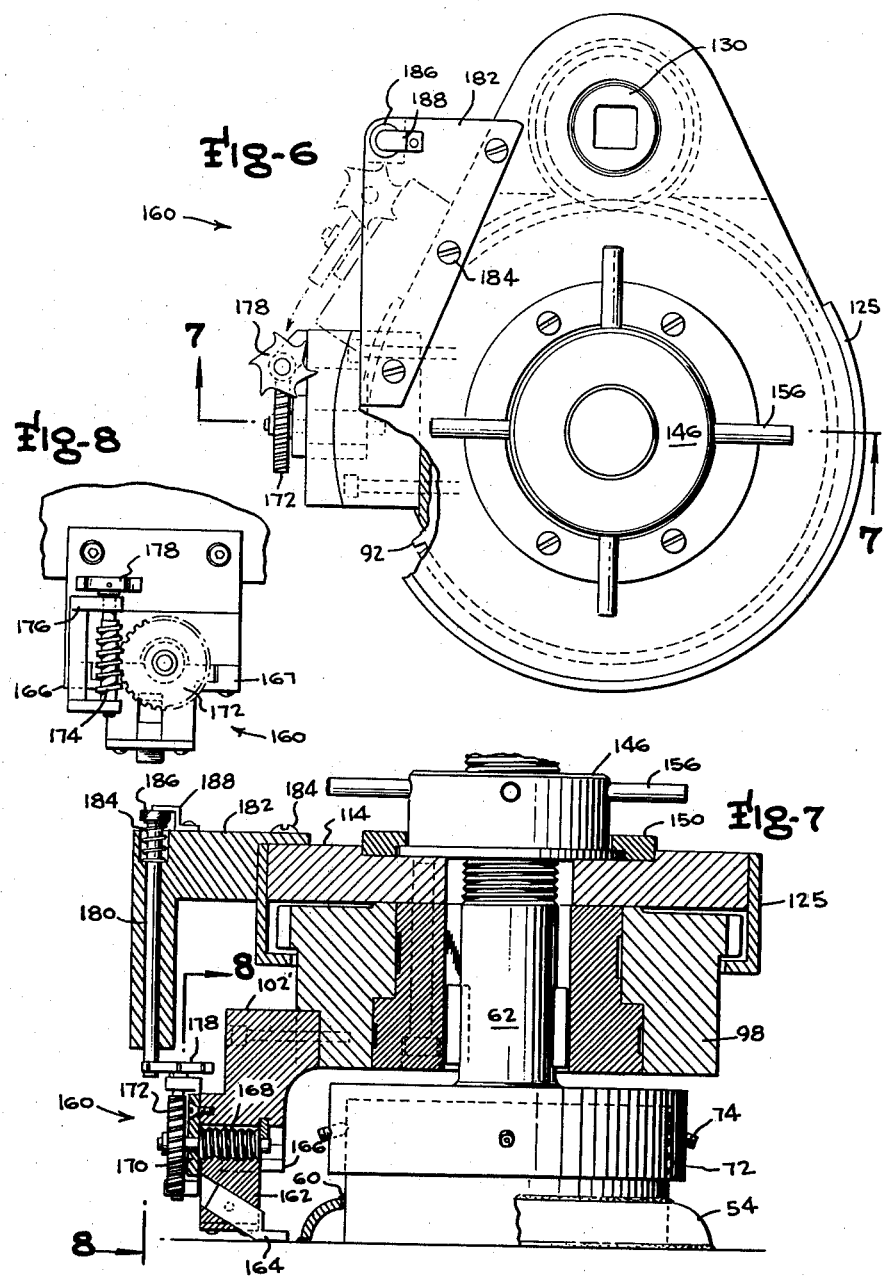

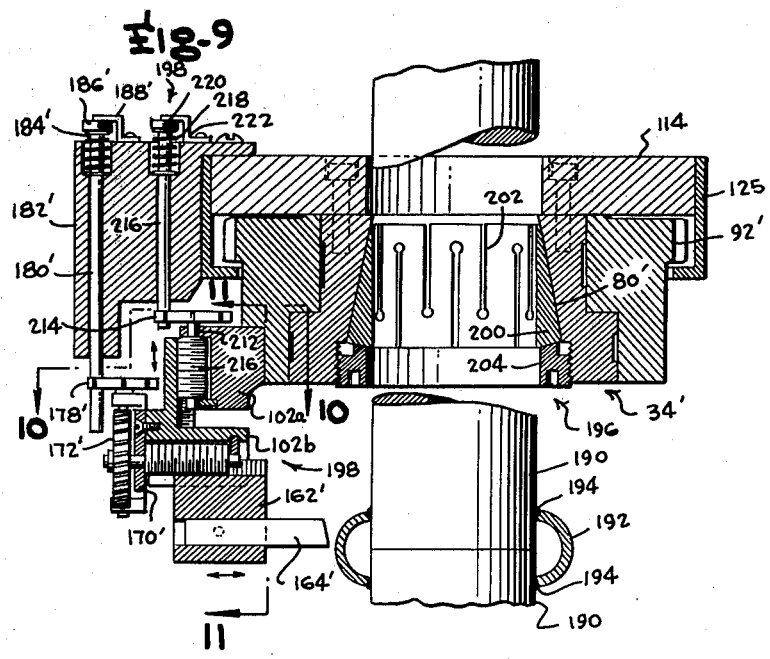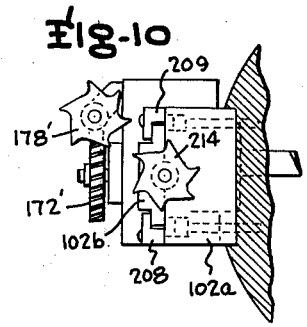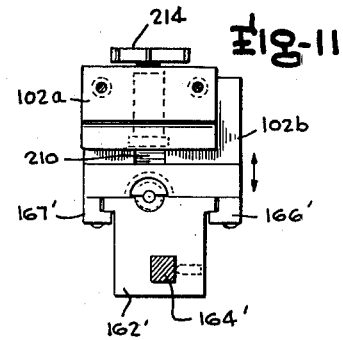

CANOPY CUTTING DEVICE

This is a division of application Ser. No. 884,245, filed Mar. 7, 1978, now U.S. Pat. No. 4,236,428.

BACKGROUND AND OBJECTS OF THE INVENTION

The present invention relates in general to portable lathes and more particularly to a canopy removing device designed for application on nuclear components to permit replacement or maintenance of various components.

In nuclear systems and the like, removable cylindrical components are joined to other cylindrical components or are positioned in a bore which results in a need to seal the circumferential joints with protective canopies. These canopies span the joints to permit expansion and contraction while preventing any contaminated material from passing through the joint. The canopies are normally truncated conical rings having an arcuate cross-section and being welded along its two edges to the adjoining components. These canopies are normally formed of a stainless steel as are the adjoining components. When it becomes necessary to remove one of the components such as for maintenance, failure of a part or renewal of a fuel supply, the canopy must be removed without contaminating the environment and without damaging either of the two assembled components.

Previously, hand grinders have been utilized in removing canopies which has been extremely time-comsuming as shown by the fact that the removal of a 5⅝th inch outside diameter canopy has required twelve hours of hand grinding. Hand grinding has been exclusively employed for this purpose in nuclear reactors in the past which has required the extensive training and employment of large numbers of operators due to the fact that each worker can remain at a work station for only a very short time period to avoid over-exposure to radiation. Since the time required for the entire grinding operation is substantial, a large number of hand grinding operators is required to complete the presently employed tedious and time-consuming process. In actuality, the radiation to which these workers are exposed results in their being able to work only a few hours a month in performing tasks in this environment; moreover, the nuclear reactor environment requires the elimination of dust and lubrication, to avoid contamination which increases the exposure time for the workers.

An additional problem arises from the fact that the canopies are frequently located in very constricted spaces such as small diameter bores and areas closely adjacent other components resulting in difficult access to the canopy cutting and removal of the canopy.

Attempts have been made to provide a device for removing the canopies without damaging the components to which each canopy has been welded. These devices have been complex, bulky and heavy and have required the use of skilled and expensive operators to remove even the canopies which were large and conveniently located. While this previous equipment has reduced the time required for hand grinding removal of the canopies in many instances, it has not been usable in restricted and confined spaces and has continued to require long periods of operation in radiation environments thereby requiring numerous operators to complete a given task.

It is, therefore, a primary object of the present invention to provide a new and useful canopy cutting device.

An additional object of the present invention is to provide a novel canopy cutting device which is extremely small compared to the item being removed thereby permitting its application to cutting operations in extremely confined areas.

A further object of the present invention is to provide a novel canopy cutting device which can perform efficient machining operations when used by an inexperienced operator in very confined spaces.

A further object of the present invention is to provide a novel canopy cutting device which drastically reduces the exposure of operators to radiation when the device is used to remove canopies in nuclear reactors.

Another object of the present invention is to provide a novel canopy cutting device which is extremely simple in construction and requires a minimum of maintenance over a long useful life.

A further object of the present invention is to provide a novel canopy cutting device which can be operated without any lubrication of the device or cutting tool while permitting the removal of stainless steel, inconel and other special alloys found in nuclear reactors and the like thereby eliminating a potential source of contamination and exposure time to radiation which would result in attempting to clean up the contamination.

A further object of the present invention is to provide a canopy cutting device which is capable of facing or otherwise machining the component to which the canopy is attached prior to installing another canopy.

A further object of the present invention is to provide a novel canopy cutting device which does not have excessive chattering of the tool bit and operates smoothly without part breakage or stalling.

A still further object of the present invention is to provide a machine which is simple and safe to operate with a minimum of operator skill and with all adjustments being convenient while the device is being operated in either vertical or horizontal positions.

Other objects, advantages and capabilities of the present invention will become apparent from the following detailed description taken in conjunction with the accompanying drawings illustrating the preferred embodiment of the invention.

BRIEF DESCRIPTION OF THE FIGURES

FIG. 1 is a top elevation view of a first embodiment of the present invention;

FIG. 2 is a side elevation view shown in the operating position prior to removal of the weld and canopy shown in dotted lines;

FIG. 5 is an exploded perspective view of the canopy cutting device;

FIG. 6 is a top elevation view of an alternative embodiment of the present invention;

FIG. 7 is a side elevational view, taken along line 7—7 in FIG. 6;

FIG. 8 is a side elevational view of the radial feed mechanism taken along lines 8—8 in FIG. 7;

FIG. 9 is a sectional side elevational view of a second alternative embodiment;

FIG. 10 is a sectional view taken along line 10—10 in FIG. 9; and

FIG. 11 is a sectional view taken along line 11—11 in FIG. 9.

DETAILED DESCRIPTION OF A PREFERRED EMBODIMENT

Figure 3:
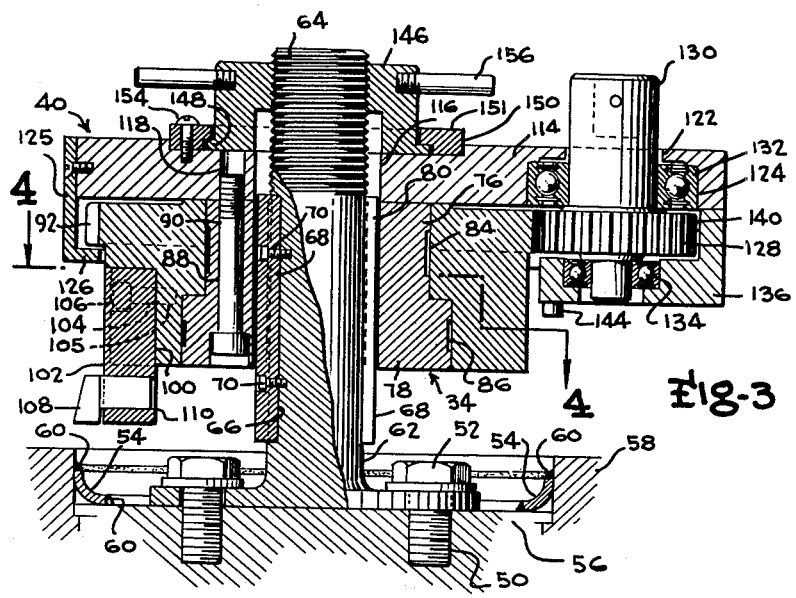
FIG. 3 is a vertical sectional view, taken along line 3—3 in FIG. 1.

Referring to the drawings wherein like reference characters designate corresponding parts throughout the several figures, the canopy cutting device of the present invention is indicated generally by the reference character 30, and as shown in FIG. 5 includes a stub shaft assembly 32, a bearing assembly 34, a ring gear carriage assembly 36, a tool assembly 38, a housing 40, a pinion drive gear assembly 42 and an axial feed assembly 44.

The canopy cutting device is supported on the stub shaft assembly 32, as best shown in FIGS. 2, 3 and 5, and includes a circular base flange plate 46 having a plurality of through bolt holes 48 positioned around the outer edge thereof and registrable with threaded bores 50 of a supporting component 56, as illustrated in FIG. 3, to receive mounting bolts 52. The stub shaft assembly is secured in the desired position by bolts 52 with the axis of the stub shaft coincident with the axis of a canopy 54 which has been secured to adjacent components 56 and 58 by circular or ringlike weld beads 60. Extending upwardly from the base plate 46 is a stub shaft 62 having a free end 64 thereof threaded to engage and support the axial feed assembly 44. The stub shaft 62 has diametrically positioned longitudinal keyways 66 to receive keys 68 which are retained in the keyways 66 by mounting bolts 70, as best shown in FIG. 3. An alternative embodiment 32' of the stub shaft flange is identical to the embodiment 32 with the exception of eliminating the bolt holes 48 and adding a downwardly projecting outer lip 72 with set screws 74 extending radially therethrough, as shown in FIG. 5, to permit clamping of the cup shaped base plate on a projecting portion of a component which is employed in some installations. It should be understood that the base plate can be of any of a wide variety of configurations including means of attachment which is capable of rigidly positioning the stub shaft 62 in the desired position.

Figure 4:
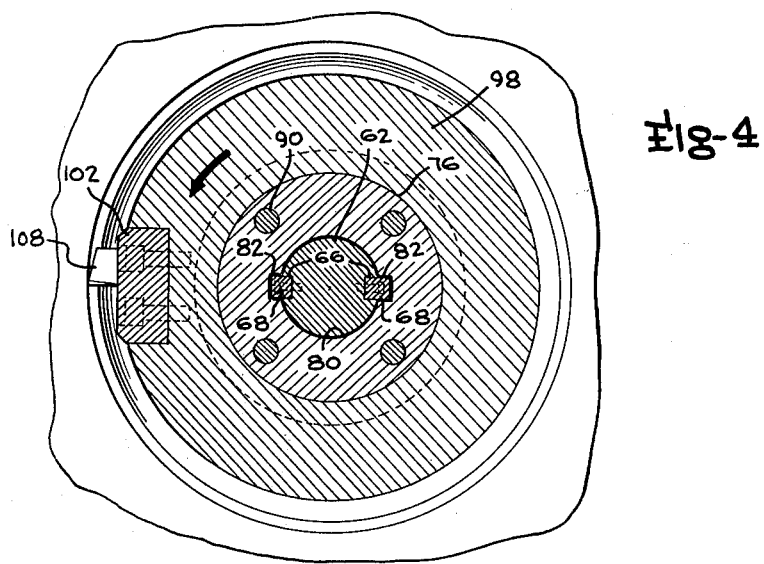
FIG. 4 is a horizontal sectional view taken along line 4—4 in FIG. 3.

The bearing assembly 34 is generally cylindrical in form having a smaller diameter upper portion 76 and a larger diameter lower portion 78 with a through bore 80 sized to fit closely over the stub shaft 62 and having diametrically opposed keyways 82 which are sized to fit closely over the keys 68 bolted to the stub shaft 62, as shown in FIG. 4. The upper portion 76 and lower portion 78 may have circumferential grooves 84 and 86, as best shown in FIGS. 3 and 5, to permit lubrication of the bearing in those applications where lubrication will not cause contamination. The bearing assembly is machined from bronze and because of its relatively large dimensions, has a long useful life. A coating or impregnation with a material such as Teflon may be used on the outer surface of the bearing assembly 34 in those applications where extremely low friction is desirable and lubrication is not permitted. Through bolt holes 88 extending axially through the upper and lower portions 76 and 78 of the bearing assembly to permit insertion of mounting bolts 90, as shown in FIGS. 3 and 5, to attach the bearing assembly to the housing assembly 40.

The ring gear and carriage assembly 36 is mounted for rotation on bearing assembly 34 as best shown in FIGS. 3 and 5 and is constructed of hardened steel; the assembly is generally cylindrical in configuration with a ring gear 92 being formed around the upper periphery thereof. A bore extends axially through the assembly 36 and includes a small diameter portion 84 and a larger diameter portion 86 to matingly engage the upper and lower portions 76 and 78 of the bearing assembly 34 as shown in FIG. 3 to permit free rotation of the ring gear assembly about the bearing assembly. A lower carrier portion 98 of the ring carrier assembly has a smaller outside diameter than the ring gear 92 and has a tool receiving radial recess 100 as shown in FIGS. 3 and 5.

The tool assembly 38 includes a generally rectangular mounting tool block 102 sized to closely fit in the recess 100 with bolt holes 104 in the mounting block being registrable with threaded bores 105 in the carrier portion 98 as shown in FIG. 3; mounting bolts 106 extend through bolt holes 104 into threaded bores 105 to retain the tool assembly in the recess 100. A cutting bit 108 is retained in an appropriate slot 110 extending radially through the tool block 102 to project outwardly, as shown in FIG. 4, to engage the canopy 54 during the cutting operation. Tool bit 108 is retained in position by a set screw 112 shown in dotted lines in FIG. 2.

The housing assembly 40 includes a base plate 114 which is partially circular in shape and slightly larger than the diameter of the ring gear on one end with an opening 116 being provided to fit over, but not touch, the stub shaft 62, as shown in FIG. 3. Threaded bores 118 (FIG. 5) are positioned around opening 116 to be threadingly engaged by mounting bolts 90 which extend upwardly from the bearing assembly 34 into into the base plate 114 as shown in FIG. 3.

The base plate 114 also includes an eccentric portion 120 having a drive shaft opening 122 therethrough opening into a larger diameter bearing receiving bore 124 extending through the lower surface of the base plate 114, as best shown in FIG. 3. A suitable guard 125 may be attached to a portion of the outer periphery of the base plate 114 and includes an inwardly directed lower lip 126 which extends beneath the ring gear 92 as shown in FIG. 3 to prevent any accidental contact with the ring gear. The guard 125 is attached by appropriate screws or similar fasteners to the base plate 114.

The ring gear 92 is driven by a drive pinion 128 in the pinion drive assembly 42 surrounding and keyed to a drive shaft 130 journaled in bearings 132 and 134. Bearing 132 is mounted in bearing receiving bore 124 in base plate 114 and bearings 134 is mounted in a bearing support plate 136 having a bearing receiving bore 138 and pinion clearance bore 140 alignable with bores 122 and 124 in the base plate 114 to receive the bearing 134 and the pinion gear 128 as shown in FIG. 3. The support plate 136 may include extensions 142 which provide a guard for the portion of the ring gear 92 which is not protected by the shield 125 as best shown in FIG. 2. The drive pinion support plate 136 may be attached to the base plate 114 in the conventional manner by mounting bolts 144 as shown in FIGS. 2 and 3. The drive shaft 130 has a nonround socket or recess, such as a square cross-section socket, indicated at 130a, to receive the drive shaft of a suitable driving tool, such as a pneumatic drive motor, to drive the pinion 128 and ring gear 92. The ring gear 92 upon rotation about the axis of the stub shaft 62, carries with it the cutting bit 108.

Axial feed is provided by the axial feed assembly 44 which includes an axial feed nut 146 engageable with the threaded end 64 of the stub shaft 62. The axial feed nut 146 has a radially projecting annular lip 148 around the lower edge thereof to permit retention of the nut 146 in the desired position relative to the base plate 114 by a retaining ring 150. An inwardly directed upper lip 151 having an inside diameter larger than the outside diameter of the nut 146 and a diameter smaller than the outside diameter of the lip 148 to permit retention of the nut in position in a shallow recess 152 formed around the opening 116 in the base plate 114. The retaining ring 150 is bolted to the base plate 114 by retaining bolts 154 such as to permit free rotation of the nut 146 while preventing any axial movement relative to the base plate 114. Extending outwardly from the nut 146 are two pairs of diametrically opposed pins positioned at right angles to permit manual rotation of the feed nut when the operator presses against the pins 156 in the desired direction to cause rotation of the nut on the stub shaft 62 thereby moving the cutting bit 108 either toward or away from the canopy as desired.

Referring now to FIGS. 6, 7 and 8, there is disclosed a radial feed assembly 160 for use with the canopy cutter disclosed in FIGS. 1 through 5. The radial feed assembly 160 includes a tool mounting block 102' which is bolted to the carrier portion 98 of the ring gear assembly 36 in the same manner as tool mounting block 102 shown in FIGS. 2 and 3. The tool mounting block 102 supports a cutting tool holder 162 mounting a securely held cutting tool 164 and guided for reciprocative movement radially of the stub shaft axis toward and away from the stub shaft axis between guide members 166 and 167 fastened to the mounting block 102' as shown in FIG. 8. The cutting tool holder 162 is precisely advanced and retracted along its radial guide axis by a feed screw 168 threaded into a threaded recess in the cutting tool holder 162 and having a shaft portion journaled in a mounting plate 170 fastened to the mounting plate 102', as shown in FIG. 7. Outwardly of the mounting plate 170 is a worm gear 172 held on the shaft of the feed screw 168 and engaged with a worm 174 journaled in a worm bracket 176 also fixed to the mounting plate 102'. The worm 174 is fixed on a shaft or has an integral shaft portion extending therefrom on which is pinned or otherwise fixed a star wheel 178 which is located beyond the periphery of the ring gear 92.

A feed pin 180, extending through a feed pin mounting bracket 182 which is bolted to the base plate 114 of the housing assembly 40 by mounting bolts 184, has its lower end positionable in the circular path of the movement of the star wheel 178 as the star wheel is carried by the ring gear 92 to rotate the star wheel and the worm through a selected angular distance. For example, the star wheel rotates one-sixth of a revolution each time the star wheel strikes the feed pin to advance the cutting tool 164 inwardly through a selected small distance at least once during each revolution of the ring gear 92. In the embodiment shown in FIGS. 6 and 7, the feed pin has a coil spring 184 surrounding the shank of the feed pin between an enlarged head 186 and the bracket 182 with the feed pin being held in a drive position in which the enlarged head 186 engages a feed pin retaining bracket 188. When feed pin 180 is in an elevated position, its lower end is higher than star wheel 178 so that the star wheel passes beneath and does not engage the pin 180 and there is consequently no radial feed of the tool; however, feed pin 180 can be moved downwardly to its drive position by manual engagement of head 186 so as to position its lower end in the path of the star wheel so as to effect rotation of the star wheel and resultant radial feed of the tool under complete control of the operator.

Operation of the canopy cutting device is easily and quickly accomplished by a person of minimum skill and training by first attaching an appropriate base plate assembly such as 32 or 32' and centering the shaft to cause the tool bit 108 to rotate about the desired axis for removal of the weld 60 and canopy 54. The operator then aligns the keyways 82 in the bearing assembly 34 with the keys 68 on the stub shaft 62 and lowers the device until the feed nut 146 engages the threaded end 64 of the stub shaft 62 at which time the operator manually rotates the feed nut 146 by applying torque to the pins 156 extending therefrom to lower the cutting tool to the desired beginning position. Drive power is then suitably applied to the drive shaft 130 such as by a pneumatic drive motor which causes the drive pinion 128 to rotate and drive ring gear 92 to cause the cutting assembly 38 to rotate about the axis of the stub shaft. For a 5¾ inch outside diameter canopy, the ring gear would be driven at approximately 50 revolutions per minute. The operator then rotates the feed nut 146 at an appropriate speed consistent with the material being removed until the desired material has been removed at which time the drive shaft can be disconnected from the motor and the direction of rotation of the feed nut 146 reversed to remove the device from the stub shaft thereby completing the operation.

As can be seen, this extremely simple device, having very few parts, is easily assembled and is capable of removing canopies in less than an hour which had previously required twelve hours of skilled hand grinding to remove.

Referring now to the embodiment shown in FIGS. 9, 10 and 11, there is illustrated a second alternative embodiment installed on a valve 190 and 190' having a canopy 192 attached by welds 194 to the adjacent valve members. This embodiment is similar to those illustrated in FIGS. 1 through 8 with the replacement of the keyway and axial feed nut of the other embodiments by a collet locking assembly 196 and an automatic axial feed mechanism 198.

In this embodiment, the bearing assembly 34' has a truncated conical bore portion 80' designed to receive an annular collet 200 having a substantially triangular cross-section, as illustrated in FIG. 9, and having cuts 202 extending through a major portion of the axial length of the collet segment and spaced circumferentially thereof with alternate cuts opening through opposite ends of the collet to render the collet flexibly deformable. A collet nut 204 is threadably engageable with a threaded bore of the center opening of the bearing assembly and has a surface conforming to the adjacent surface of the collet and is forced against the collet to cam them into tightly clamping relation with the valve stem 190 to lock the canopy cutting device in the desired position. Radial feeding of the cutting tool 164' is accomplished in the same manner as that described for the embodiment shown in FIG. 7 and the corresponding parts are identified with primed numbers.

Reciprocative axial feed is accomplished by the automatic axial feed mechanism 198 mounted between an upper portion 102a and a lower portion 102b forming the tool mounting block of this embodiment, as shown in FIG. 9. The lower portion 102b is guided in the axial direction by guide members 208 and 209 fastened to the upper portion 102a, as shown in FIG. 10. The cutting tool holder 162' is precisely advanced and retracted along the axial direction by a feed screw 210 threaded into a threaded recess in the lower portion 102b and has a shaft portion journaled in a bore 212 formed in the upper portion 102a as shown in FIG. 9, and has an integral shaft portion extending therefrom on which is pinned or otherwise fixed a star wheel 214. A second feed pin 216 is mounted in the feed pin support bracket 182' for axial movement between a drive position in which its lower end is in the path of movement of star wheel 214 and an elevated position in which its lower end is above the star wheel. Engagement of star wheel 214 with the lower end of the second feed pin 216 serves to rotate the star wheel through a selected angular distance, for example, one-sixth of a revolution, each time the star wheel strikes the feed pin, to advance the cutting tool holder 162' and tool 164' axially through a selected small distance at least once during each revolution of the ring gear. In the embodiment herein illustrated, the feed pin has a coil spring 218 surrounding the shank of the feed pin between an enlarged head 220 and a lower surface of the support bracket 182. The feed pin is held in position by a feed pin retaining bracket 222.

From the foregoing detailed description, it will be evident that there are a number of changes, adaptations and modifications of the present invention which come within the province of those skilled in the art. However, it is intended that all such variations not departing from the spirit of the invention be considered as within the scope thereof and as limited solely by the appended claims.

I claim:

1. A canopy cutting device for machining canopies and the like in constricted spaces, said device comprising a housing including a base plate, a bearing mounted on said housing and having an axis, means for retaining the axis of said bearing in a desired position, a ring gear mounted on said bearing for rotation about said bearing, a cutting tool mounted on and externally of said ring gear, a pinion gear mounted for rotation on said housing and engageable with teeth extending about the outer periphery of said ring gear, means for driving said pinion gear and means for advancing said cutting tool along a line parallel to said axis, means for advancing said cutting tool along a line perpendicular to said axis during rotation of the ring gear thereby permitting removal of a canopy or the like, wherein said means for advancing said cutting tool includes a cutting tool holder slidably mounted on the ring gear for axial and radial reciprocative movement and supporting the cutting tool, feed screw means for moving said cutting tool holder, indexing wheel means coupled to the feed screw means and extending outwardly beyond the perimeter of the ring gear and carried in a circular path about the axis during rotation of the ring gear and feed pin means positionable in said circular path of movement of the indexing wheel means to intercept and rotate the indexing wheel means through a selected increment for driving the feed screw means to advance the cutting tool holder through one step.

2. The canopy cutting device of claim 1 wherein said means for retaining the axis of said bearing in a desired position comprises a collet and means for compressing said collet around a desired cylindrical component.

3. The canopy cutting device of claim 1 wherein two feed pins are respectively provided for engaging two respective star wheels for respectively effecting radial and axial feeding of said cutting tool holder.

4. The canopy cutting device of claim 3 additionally including spring means for biasing said feed pins into a position in which the feed pins are not in the path of movement of the two respective indexing wheels each of which is a star wheel.

5. The canopy cutting device of claim 4 wherein said means for retaining the axis of said bearing in a desired position comprises a collet and means for compressing said collet around a desired cylindrical component.

6. The canopy cutting device of claim 2 wherein two feed pins are respectively provided for engaging indexing wheels comprising two respective star wheels for respectively effecting radial and axial feeding of said cutting tool holder.

7. The canopy cutting device of claim 1 wherein said feed pin means is mounted for axial movement between a first position out of the path of movement of the indexing wheel and a second position in the path of movement of the indexing wheel.

8. The canopy cutting device of claim 7 additionally including spring means for urging said feed pin means toward said first position.

9. The canopy cutting device of claim 8 wherein said means for retaining the axis of said bearing in a desired position comprises a collet and means for compressing said collet around a desired cylindrical component.

* * * * *